(12) United States Patent
Shim et al.

(10) Patent No.: US 8,805,108 B2
(45) Date of Patent: Aug. 12, 2014

(54) JPEG DECODER CAPABLE OF SCALING AND SCALING METHOD USING THE SAME

(75) Inventors: Jae Oh Shim, Seoul (KR); Jogn Phil Kim, Seongnam-si (KR)

(73) Assignee: Siliconfile Technologies, Inc., Seoul (KR)

( * ) Notice: Subject to any disclaimer, the term of this patent is extended or adjusted under 35 U.S.C. 154(b) by 257 days.

(21) Appl. No.: 12/938,903

(22) Filed: Nov. 3, 2010

(65) Prior Publication Data

US 2011/0103704 A1    May 5, 2011

(30) Foreign Application Priority Data

Nov. 5, 2009    (KR) .................. 10-2009-0106619

(51) Int. Cl.
*G06K 9/46* (2006.01)
*G06K 9/00* (2006.01)
*G06K 9/36* (2006.01)
*H04N 7/26* (2006.01)
*H04N 7/46* (2006.01)

(52) U.S. Cl.
CPC ... *H04N 19/00303* (2013.01); *H04N 19/00533* (2013.01); *H04N 19/00127* (2013.01); *H04N 19/00757* (2013.01)
USPC ............ 382/250; 382/251; 382/232; 382/233

(58) Field of Classification Search
USPC .................. 382/250, 232–233, 251
See application file for complete search history.

(56) References Cited

U.S. PATENT DOCUMENTS

| | | | |
|---|---|---|---|
| 6,111,989 A * | 8/2000 | Chang et al. .................. | 382/250 |
| 6,246,802 B1 * | 6/2001 | Fujihara et al. ............... | 382/276 |
| 7,388,994 B2 * | 6/2008 | Sun et al. ...................... | 382/250 |
| 7,565,021 B2 * | 7/2009 | Feng et al. .................... | 382/239 |
| 2008/0008248 A1 * | 1/2008 | Takakura et al. ......... | 375/240.18 |
| 2010/0266008 A1 * | 10/2010 | Reznik ....................... | 375/240.2 |

\* cited by examiner

*Primary Examiner* — Matthew Bella
*Assistant Examiner* — Weiwen Yang
(74) *Attorney, Agent, or Firm* — Kile Park Reed & Houtteman PLLC

(57) ABSTRACT

A JPEG decoder having a scaling function includes an inverse discrete cosine transform block, wherein the JPEG decoder selectively performs an inverse discrete cosine transform on a part of pixel data of a macroblock through the inverse discrete cosine transform block and outputs a scaled image file. The JPEG decoder and the scaling method using the JPEG decoder increase a decoding speed, thereby enabling an image to be output in real time, especially when the JPEG decoder and/or the scaling method are applied to a mobile field. Also, the JPEG decoder and the scaling method using the JPEG decoder can achieve an efficient scaling, even without a separate circuit for scaling, thereby reducing a circuit size and the number of components.

10 Claims, 4 Drawing Sheets

(a)    (b)    (c)

JPEG DECODER CAPABLE OF SCALING AND SCALING METHOD USING THE SAME

BACKGROUND OF THE INVENTION

1. Field of the Invention

The present invention relates to a JPEG decoder capable of scaling and a scaling method using the same, and more particularly, to a JPEG decoder having a scaling function, which scales and outputs an image file through the use of an inverse discrete cosine transform (IDCT) circuit included in the decoder, without a separate circuit for scaling, while increasing a decoding speed, and a scaling method using the JPEG decoder.

2. Description of the Related Art

Joint Photography Experts Group (JPEG) is an international standard for compression of still color images. JPEG compresses image information through the use of various algorithms, including Discrete Cosine Transform (DCT), Quantization, Variable Length Coding, etc.

Especially, JPEG is used in various fields, such as a digital camera, a mobile image sensor (CIS), etc., and recently, JPEG has been so widely used in a mobile field. When the conventional JPEG decoder for mobile is implemented with a general algorithm, the decoding speed is slow, which is not suitable for real-time output in mobile LCD displays.

Also, since the mobile LCD displays do not generally require a high output resolution, the mobile LCD displays employ a scheme of outputting an image of a low resolution through scaling.

For reference, although a high-resolution image provides a superior visual quality to that of a low-resolution image, it is necessary to use a low-resolution image in order to be matched with a bandwidth and other peripheral circuits.

An image scaling method employs a scheme in which most of. the entire scene of an image before scaling is maintained while the size of the image is reduced. Although the scene of an original image is completely remained in an image after scaling, the scaled image is expressed in a lower resolution. Most of general scaling schemes scale an image in such a manner as to equalize pixels with an equal weighting in a specific image area, and then to discard a predetermined part of the entire pixels in the area.

However, such a scaling scheme requires a separate functional block for scaling an image output from a JPEG decoder, thereby increasing the product size, and additionally increasing time required in a scaling block, which makes it impossible to output an image file in real time required, particularly in the mobile field.

SUMMARY OF THE INVENTION

Accordingly, the present invention has been made in an effort to solve the problems occurring in the related art, and an object of the present invention is to provide a JPEG decoder having a scaling function, which can increase a decoding speed through the use of an inverse discrete cosine transform (IDCT) circuit included in the JPEG decoder, without using a separate block for scaling, and also can output an image with a desired resolution, and a scaling method using the JPEG decoder.

In order to achieve the above object, according to one aspect of the present invention, there is provided a JPEG decoder having a scaling function, the JPEG decoder including an inverse discrete cosine transform block, wherein the JPEG decoder selectively performs an inverse discrete cosine transform on a part of pixel data of a macroblock through the inverse discrete cosine transform block and outputs a scaled image file.

According to another aspect of the present invention, there is provided a scaling method of a JPEG decoder, the method including the steps of: (a) outputting encoded data as serial data through variable length decoding; (b) re-ordering the serial data in an 8×8 macroblock, which is a two-dimensional arrangement format; (c) dequantizing and outputting pixel data of the 8×8 macroblock according to a scaling control signal; and (d) performing an inverse discrete cosine transform only on data of a pixel which is selected from among the dequantized 8×8 pixels according to the scaling control signal, and outputting an image file.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
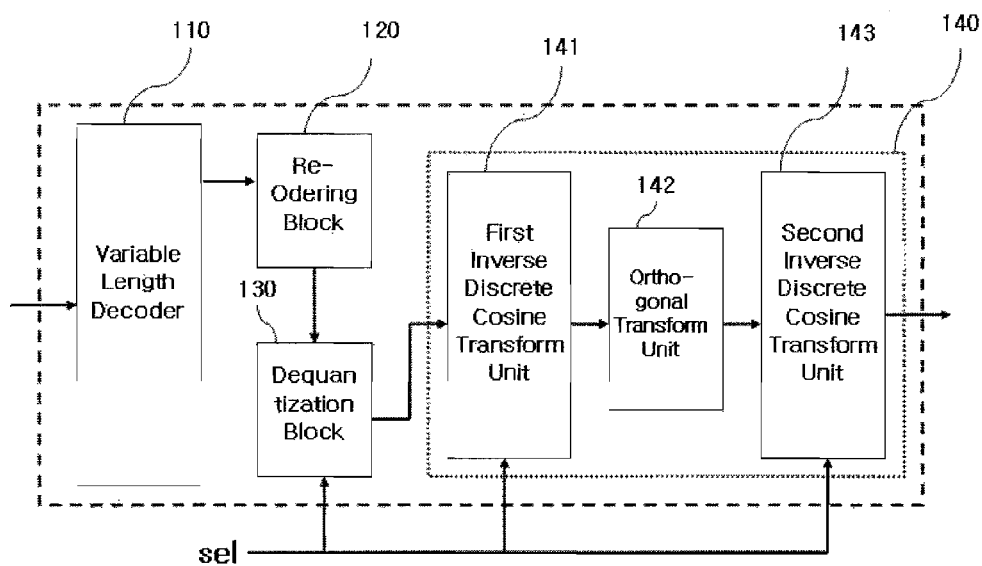
FIG. 1 is a view illustrating the configuration of a JPEG decoder having a scaling function according to an embodiment of the present invention.

Reference will now be made in greater detail to preferred embodiments of the invention, an example of which is illustrated in the accompanying drawings. Wherever possible, the same reference numerals will be used throughout the drawings and the description to refer to the same or like parts.

The present invention provides a scaling method for controlling the capacity and resolution of an image file when decoding encoded data by means of a JPEG decoder.

Generally, the encoding and decoding procedures of JPEG are processed in units of macroblocks including 8×8 pixels.

FIG. 1 is a view illustrating the configuration of a JPEG decoder having a scaling function according to an embodiment of the present invention.

A JPEG decoder having a scaling function, shown in FIG. 1, includes a variable length decoder (VLD) 110, a re-ordering block 120, a dequantization block 130, and an inverse discrete cosine transform (IDCT) block 140.

The variable length decoder 110 performs a variable length decoding operation on data, which has been encoded through JPEG encoder, thereby outputting serial data.

Also, the variable length decoder 110 extracts a codeword from a stream encoded with various lengths, and obtains symbols corresponding to the codeword. Since the codeword has a variable length, a binary tree or PLA is used to find a code value of a predetermined magnitude from the stream encoded with various lengths, wherein it is preferred to use the PLA in terms of speed.

Also, the variable length decoder 110 has a function of reading a code value of a fixed magnitude from encoded streams of various lengths, a function of finding a specific bit pattern from encoded streams of various lengths, and a function of extracting a codeword from encoded streams of various lengths and outputting a symbol.

The re-ordering block 120 re-orders the output data of the variable length decoder 110 in an 8×8 macroblock, which is a two-dimensional arrangement format.

The dequantization block 130 receives data output from the re-ordering block 120, and dequantizes and outputs only a part of the received data according to a scaling control signal "sel."

Also, the dequantization block 130 dequantizes data, which is output from the re-ordering block 120, through the use of a quantization table used in JPEG encoding, and selects and outputs a part of the dequantized data according to a scaling control signal "sel."

Here, a scheme of selecting data in the dequantization block 130 is to output only pixel data required in an operation in the inverse discrete cosine transform block 140. For example, in ¼ scaling, only data corresponding to first and fifth columns of a macroblock among data of the dequantization block 130 is output to the inverse discrete cosine transform block 140.

The inverse discrete cosine transform block 140 performs an inverse discrete cosine transform operation on data of only partial pixels selected according to the scaling control signal "sel," among data received from the dequantization block 130.

In detail, the inverse discrete cosine transform block 140 first performs an operation on data of a corresponding sample column according to the scaling control signal "sel," performs an orthogonal transform, and then performs a second transform of performing an operation on data of only pixels, which are overlapped with those in the first transform in a corresponding sample column according to the scaling control signal "sel," in the orthogonal transformed macroblock.

In more detail, the inverse discrete cosine transform block 140 includes a first inverse discrete cosine transform unit 141, an orthogonal transform unit 142, and a second inverse discrete cosine transform unit 143.

The first inverse discrete cosine transform unit 141 performs an inverse discrete cosine transform on data of only a selected column among eight columns of a macroblock according to the scaling control signal "sel." The scaling control signal "sel" is a signal having a different voltage level depending on a degree of scaling.

For example, in ¼ scaling, the first inverse discrete cosine transform unit 141 performs an operation on data of only first and fifth columns among eight columns of a macroblock, and does not perform an operation on data of the other columns. Also, in ⅛ scaling, the first inverse discrete cosine transform unit 141 performs an operation on data of only a first column among eight columns of a macroblock, and does not perform an operation on data of the other columns.

Also, in ½ scaling, the first inverse discrete cosine transform unit 141 performs an operation on data of only first, third, fifth, and seventh columns among eight columns of a macroblock in a manner of performing an operation every other column, and does not perform an operation on data of the other columns.

Figure 2:
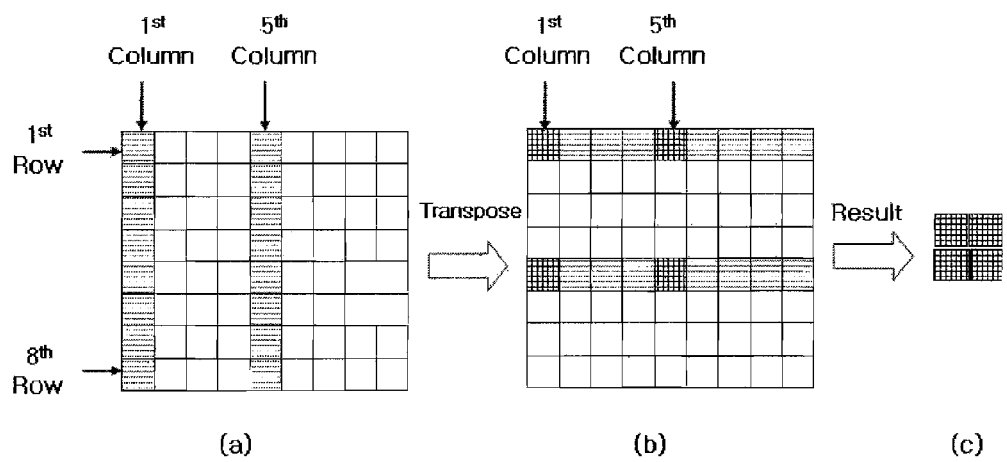
FIG. 2 is a view explaining a detailed operation of the inverse discrete cosine transform block and a degree of reduction in the amount of operation in ¼ scaling.

The orthogonal transform unit 142 performs a 90-degree orthogonal transform on an 8×8 macroblock, which has been subjected to the operation in the first inverse discrete cosine transform unit 141. That is, rows and columns are transposed. Referring to FIG. 2, first and fifth columns (i.e. parts shown in horizontal line) of a macroblock are subjected to an operation in the first inverse discrete cosine transform unit 141, and are then transformed to first and fifth rows of the macroblock, respectively.

The second inverse discrete cosine transform unit 143 performs an inverse discrete cosine transform only on a selected column among eight columns of input data according to the scaling control signal "sel." Here, the second inverse discrete cosine transform unit 143 performs an operation only on data corresponding to a column, which has been subjected to an operation in the first inverse discrete cosine transform unit 141, so that both of the first inverse discrete cosine transform unit 141 and second inverse discrete cosine transform unit 143 perform an operation only on data of pixels belonging to a selected column before and after orthogonal transform.

For example, referring to FIG. 2(*b*), in ¼ scaling, the second inverse discrete cosine transform unit 143 performs an operation only on data of first and fifth columns after orthogonal transform. However, since only first and fifth rows in FIG. 2(*b*) correspond to pixels which have been subjected to an operation in the first inverse discrete cosine transform unit 141, finally, the second inverse discrete cosine transform unit 143 performs an operation only on data of a first row first column, a first row fifth column, a fifth row first column, and a fifth row fifth column (i.e. parts shown in cross line).

In contrast, while having a difference depending on algorithms, the conventional inverse discrete cosine transform (IDCT) circuit operates in three steps as follows. A first step is to perform an operation on eight pieces of input data corresponding to a first column of a macroblock by means of 33 adders and 13 multipliers, and outputs eight pieces of data. When the first step is repeated every column, eight pieces of data are output eight times. Next, a second step is to perform an orthogonal transform on data of a macroblock, which has been subjected to the operation. A third step is to once again repeat the operation of the first step on data of the macroblock, which has been re-ordered through the orthogonal transform. That is, an operation is performed on eight pieces of data of a first column among data of the re-ordered macroblock, so that eight pieces of data are output. The same operation as above is performed on each of eight columns, so that final output data of 8×8 pixels is obtained.

The first inverse discrete cosine transform unit 141 and the second inverse discrete cosine transform unit 143 are generally implemented by a program algorithm. For example, an LL&M algorithm and an AA&N algorithm are usually used, and are shown in Table 1.

TABLE 1

| | |
|---|---|
| $Tmp0 = (in0 + in4)/2^{13}$ | $S1 = Tmp4 \times (-7373)$ |
| $Tmp1 = (in0 - in4)/2^{13}$ | $S2 = Tmp5 \times (-20995)$ |
| $Tmp2 = \{(in2 + in6) \times 4433\} - (in6 \times 15137)$ | $S3 = Tmp6 \times (-16069) + Tmp8$ |
| $Tmp3 = \{(in2 + in6) \times 4433\} + (in2 \times 6270)$ | $S4 = Tmp7 \times (-3196) + Tmp8$ |
| $Tmp4 = in7 + in1$ | $Tmp20 = Tmp0 + Tmp3$ |
| $Tmp5 = in5 + in3$ | $Tmp21 = Tmp1 + Tmp2$ |
| $Tmp6 = in7 + in3$ | $Tmp22 = Tmp1 - Tmp2$ |
| $Tmp7 = in5 + in1$ | $Tmp23 = Tmp0 - Tmp3$ |
| $Tmp8 = (Tmp6 + Tmp7) \times 9633$ | $Tmp30 = Tmp10 + S1 + S3$ |
| $Tmp10 = in7 \times 2446$ | $Tmp31 = Tmp11 + S2 + S4$ |
| $Tmp11 = in5 \times 16819$ | $Tmp32 = Tmp12 + S2 + S4$ |
| $Tmp12 = in3 \times 25172$ | $Tmp33 = Tmp13 + S1 + S4$ |
| $Tmp13 = in1 \times 12299$ | |
| $Out0 = (Tmp20 + Tmp33)/2^{11}$ | |

TABLE 1-continued $$Out7 = (Tmp20 - Tmp33)/2^{11}$$
$$Out1 = (Tmp21 + Tmp32)/2^{11}$$
$$Out6 = (Tmp21 - Tmp32)/2^{11}$$
$$Out2 = (Tmp22 + Tmp31)/2^{11}$$
$$Out5 = (Tmp22 - Tmp31)/2^{11}$$
$$Out3 = (Tmp23 + Tmp30)/2^{11}$$
$$Out4 = (Tmp23 - Tmp30)/2^{11}$$

In Table 1, input data in0 to in7 represents data input to the first inverse discrete cosine transform unit 141; data which has been subjected to an operation is temporarily stored in Tmp0 to Tmp33, and S1 to S4; and data Out0 to Out7 represents finally output data. An operation as shown in Table 1 is performed every column, and the second inverse discrete cosine transform unit 143 performs the same operation, too.

In Table 1, in ¼ scaling, the first inverse discrete cosine transform unit 141 and the second inverse discrete cosine transform unit 143 reduces the amount of operation by six lines as compared with the conventional technology, so that the usage of multipliers is reduced by about 39%, and the usage of adders is reduced by about 56%.

Figure 3:
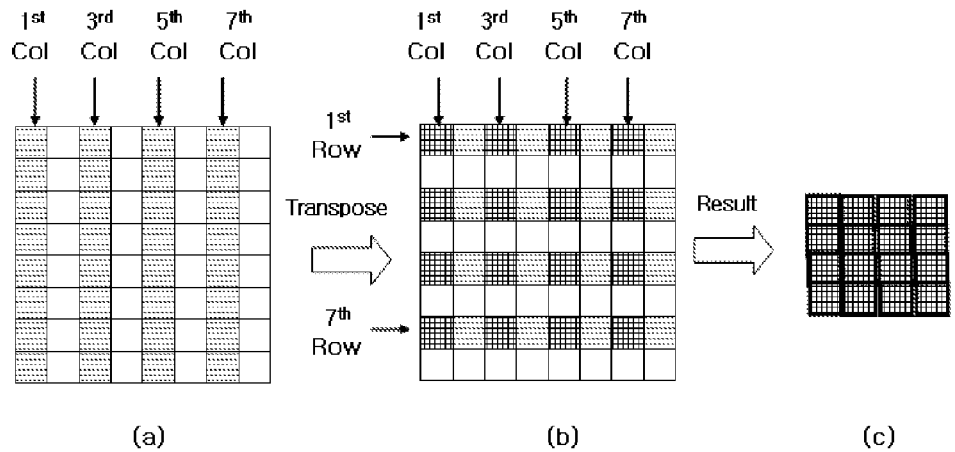
FIG. 3 is a view explaining a detailed operation of the inverse discrete cosine transform block and a degree of reduction in the amount of operation in ½ scaling.
Figure 4:
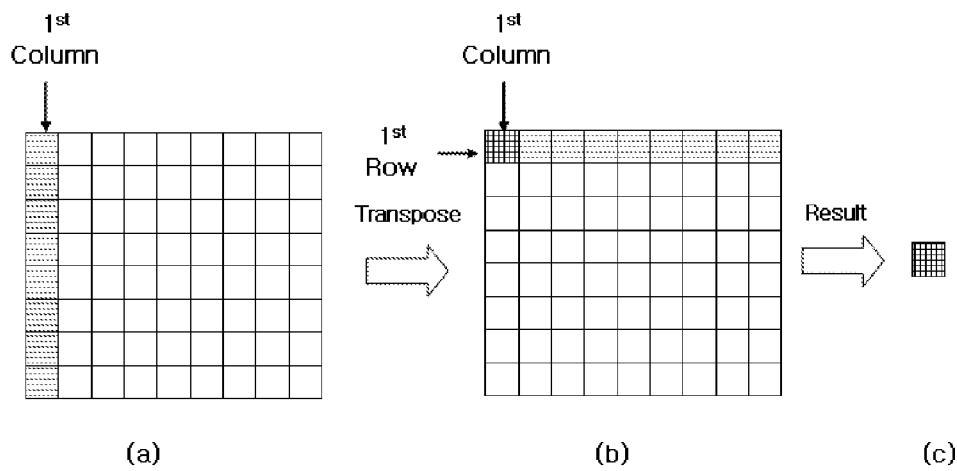
FIG. 4 is a view explaining a detailed operation of the inverse discrete cosine transform block and a degree of reduction in the amount of operation in ⅛ scaling.

FIGS. 2 to 4 are views illustrating the operation scheme of the inverse discrete cosine transform block based on scaling sizes according to present invention.

FIG. 2 is a view explaining a detailed operation of the inverse discrete cosine transform block 140 and a degree of reduction in the amount of operation in ¼ scaling.

FIG. 2(a) shows a case where the first inverse discrete cosine transform unit 141 performs an operation on pixel data of only first and fifth columns of a macroblock (parts shown in horizontal line). The first inverse discrete cosine transform unit 141 performs an operation as shown in Table 1 every column, thereby outputting eight pieces of data. Also, FIG. 2(b) shows a case where the second inverse discrete cosine transform unit 143 performs an operation only on pixels, which have been subjected to the operation in the first inverse discrete cosine transform unit 141, among first and fifth columns of a macroblock after an orthogonal transform (parts shown in cross line). In this case, the usage is reduced by 75% as compared with the conventional method, so that a decoding speed can increase as much.

Therefore, as shown in FIG. 2(c), in ¼ scaling, 8×8 macroblock data is output as 2×2 block data, so that the entire image is scaled down.

FIG. 3 is a view explaining a detailed operation of the inverse discrete cosine transform block 140 and a degree of reduction in the amount of operation in ½ scaling.

FIG. 3(a) shows a case where the first inverse discrete cosine transform unit 141 performs an operation on data of first, third, fifth, and seventh columns of a macroblock (parts shown in horizontal line). Also, FIG. 3(b) shows a case where the second inverse discrete cosine transform unit 143 performs an operation only on pixels corresponding to a first column first row, a first column third row, a first column fifth row, a first column seventh row, a third column first row, a third column third row, a third column fifth row, a third column seventh row, a fifth column first row, a fifth column third row, a fifth column fifth row, a fifth column seventh row, a seventh column first row, a seventh column third row, a seventh column fifth row, a seventh column seventh row (parts shown in cross line), which are pixels overlapped with pixels having been subjected to the operation in the first inverse discrete cosine transform unit 141, among first, third, fifth, and seventh columns of a macroblock after an orthogonal transform.

Therefore, as shown in FIG. 3(c), in ½ scaling, 8×8 macroblock data is output as 4×4 block data, so that the entire image is scaled down.

FIG. 4 is a view explaining a detailed operation of the inverse discrete cosine transform block 140 and a degree of reduction in the amount of operation in ⅛ scaling.

FIG. 4(a) shows a case where the first inverse discrete cosine transform unit 141 performs an operation on a first column of a macroblock (parts shown in horizontal line). Also, FIG. 4(b) shows a case where the second inverse discrete cosine transform unit 143 performs an operation only on the pixel of a first column first row (part shown in cross line), which is a pixel overlapped with pixels having been subjected to the operation in the first inverse discrete cosine transform unit 141, among a first column of a macroblock after an orthogonal transform.

Therefore, as shown in FIG. 4(c), in ⅛ scaling, 8×8 macroblock data is output as 1×1 block data, so that the entire image is scaled down.

Figure 5:
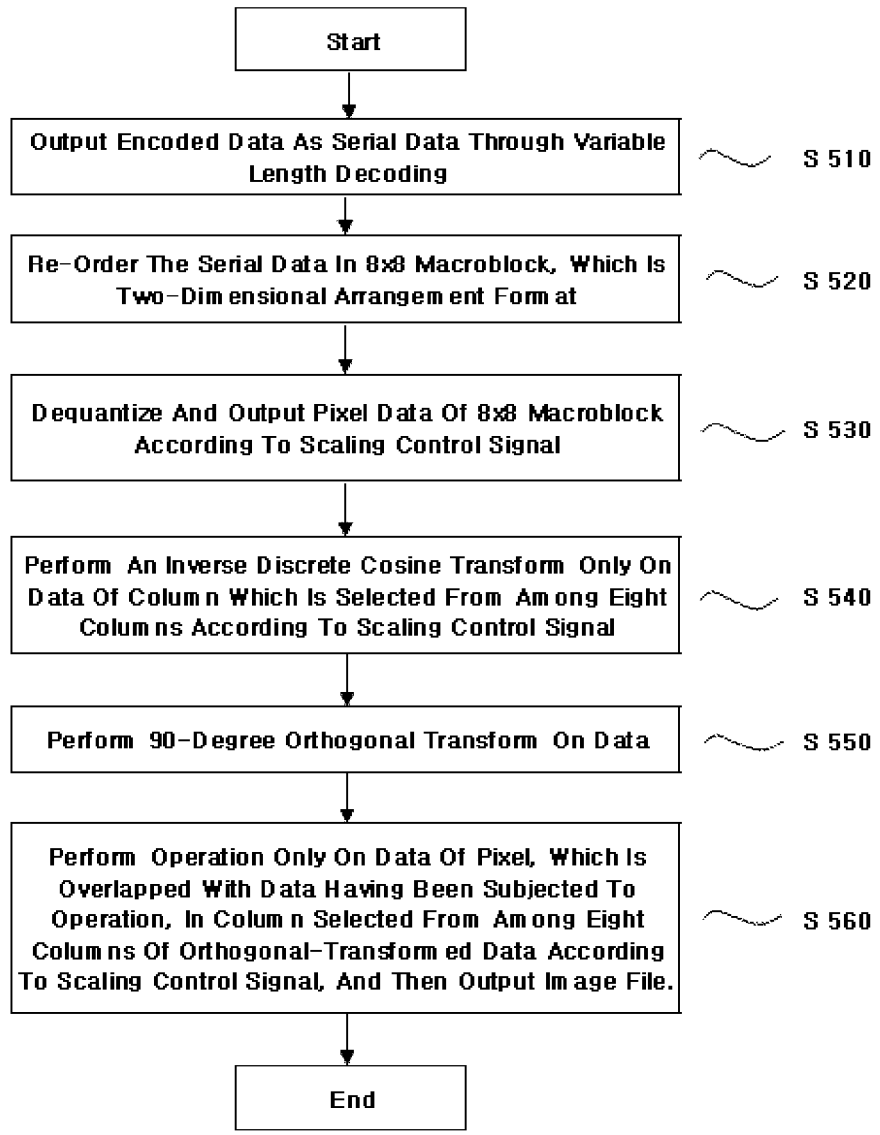
FIG. 5 is a flowchart illustrating a scaling scheme of a JPEG decoder according to the present invention.

FIG. 5 is a flowchart illustrating a scaling scheme of a JPEG decoder according to the present invention.

In a first step (S510), encoded data is output as serial data through variable length decoding.

In a second step (S520), the serial data is re-ordered in an 8×8 macroblock, which is a two-dimensional arrangement format.

In a third step (S530), pixel data of the 8×8 macroblock is dequantized according to a scaling control signal "sel," and is then output.

Also, in the third step (S530), the two-dimensionally ordered data is restored using a quantization table used in encoding, and a part of data is selected and output according to a scaling control signal "sel."

In a fourth step (S540), an inverse discrete cosine transform is performed only on data of a column which is selected from eight columns according to a scaling control signal "sel."

In a fifth step (S550), a 90-degree orthogonal transform is performed on the data.

In a sixth step (S560), an inverse discrete cosine transform is performed only on data of a pixel, which is overlapped with pixels having been subjected to the operation in the fourth step, within a column selected from eight columns of the orthogonal-transformed data according to a scaling control signal "sel," and then an image file is output.

Figure 6:
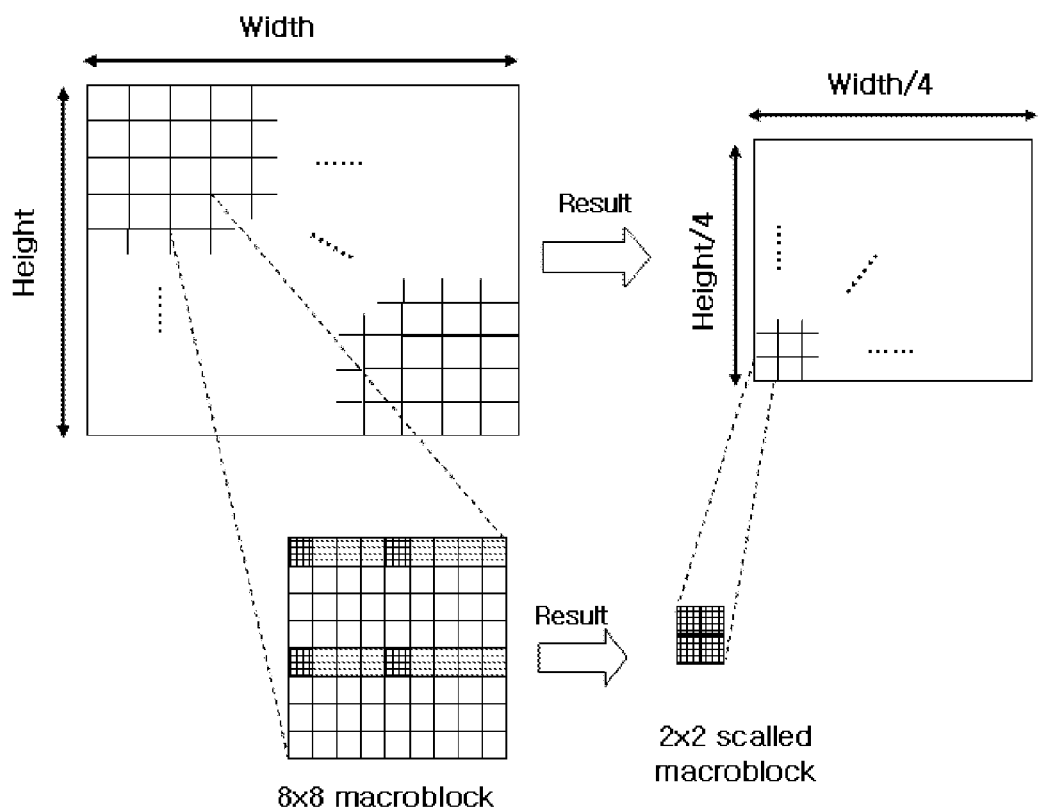
FIG. 6 is a view illustrating an effect of macroblock-by-macroblock scaling on an entire image, when a ¼ scaling scheme is employed.

FIG. 6 is a view illustrating an effect of macroblock-by-macroblock scaling on an entire image, when a ¼ scaling scheme is employed.

A plurality of macroblocks are arranged in order in the horizontal direction and vertical direction. Each macroblock is constituted with 8×8 pixels, so that a 2×2 pixel image is obtained by ¼ scaling. Consequently, it can be understood that the entire image is reduced to ¼ in width, and is reduced to ¼ in height.

A JPEG decoder having a scaling function according to the present invention can output an image file having a desired resolution according to the scaling control signal "sel." Also, since the JPEG decoder performs an operation only on data corresponding to a pixel for scaling among a block, on which the inverse discrete cosine transform block 140 performs an operation, even without a separate scaling block, the amount of operation is reduced, so that it is possible to rapidly process data. Accordingly, when the JPEG decoder according to the present invention is applied to mobile products in which a processing speed is important, a more remarkable effect is produced. In addition, since a separate scaling block is not required, there is a size reduction effect, which is more profitable for mobile products.

Also, the dequantization block 130 has only to process and transmit only data, which has been selected according to the scaling control signal "sel," to the inverse discrete cosine transform (IDCT) block 140, so that the output speed of an image file becomes faster.

For example, when an input image has a size of 5M (2592×1944), and a resolution to be output is VGA (640×480), it is possible to scale and output an image to a mobile LCD display in real time, even without adding a separate block for a scaling function.

Although the present invention has been described with a macroblock including 8×8 pixels, the present invention is not limited thereto, and can be implemented in various manners with respect to 2×2 pixels, 4×4 pixels, 8×4 pixels, 4×8 pixels, etc.

As is apparent from the above description, the present invention provides a JPEG decoder having a scaling function and a scaling method using the same, which increase a decoding speed, thereby enabling an image to be output in real time, especially when the JPEG decoder and/or the scaling method are applied to a mobile field.

Also, according to the JPEG decoder having the scaling function and the scaling method using the same based on the present invention, it is possible to achieve an efficient scaling, even without a separate circuit for scaling, so that a circuit size and the number of components are reduced.

Also, according to the present invention, it is possible to control a degree of image scaling according to a desired resolution.

In addition, these merits provide many advantages in selecting applications.

Although preferred embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. A JPEG decoder having a scaling function, the JPEG decoder comprising a dequantization block and an integrated inverse discrete cosine transform (IDCT) block, wherein the JPEG decoder is configured to perform an IDCT on a part of pixel data of a macroblock using the integrated IDCT block to control capacity and resolution of a resultant image file when decoding encoded data, and to output the decoded and scaled image file,
wherein the dequantization block is configured to:
dequantize at least a portion of pixel data of a macroblock;
select, based on a scaling control signal, dequantized pixel data of the macroblock to output to the IDCT block; and
output the selected pixel data to the IDCT block,
wherein the IDCT block comprises a first IDCT unit, an orthogonal transform unit, and a second IDCT unit,
wherein the first IDCT unit is configured to:
select, based on the scaling control signal, pixel data output from the dequantization block comprising one or more selected columns among multiple columns of the macroblock such that a first IDCT is only performed on a portion of the columns of the macroblock, wherein when more than one column is selected to perform the first IDCT, no selected column is adjacent to another selected column; and
perform the first IDCT on the selected pixel data output from the dequantization block;
wherein the orthogonal transform unit is configured to perform an orthogonal transform on the pixel data subjected to the first IDCT to transpose rows and columns of the macroblock, and
wherein the second IDCT unit is configured to:
select, based on the scaling control signal, only data of one or more selected columns among multiple columns output from the orthogonal transform unit such that a second IDCT is only performed on a portion of the columns of the macroblock, wherein when more than one column is selected to perform the second IDCT, no selected column is adjacent to another selected column, further wherein only rows within the selected column which were subjected to the first IDCT are subjected to the second IDCT such that the number of columns subjected to the first IDCT equals the number of rows per column that are subjected to the second IDCT; and
perform the second IDCT on the selected only a portion of the orthogonally transformed pixel data subjected to the first IDCT.

2. The JPEG decoder according to claim 1, further comprising:
a variable length decoder configured to receive encoded data and to output variable-length data; and
a re-ordering block configured to re-order data, which is output from the variable length decoder, in a two-dimensional macroblock;
wherein the dequantization block is configured to receive the pixel data of the macroblock output from the re-ordering block.

3. The JPEG decoder according to claim 2, wherein the dequantization block is configured to either:
dequantize the received data using a quantization table used in encoding, and select and output only a part of the dequantized data according to the scaling control signal; or
dequantize and output only a part of the received data according to the scaling control signal.

4. The JPEG decoder according to claim 1, wherein the dequantization block is configured to dequantize and output only pixel data of the macroblock, which is subjected to the first IDCT, to the IDCT block.

5. The JPEG decoder according to claim 1, wherein, in 1/X scaling where X comprises a natural number greater than 1:
the first IDCT unit is configured to select, based on the scaling control signal, one column every X columns from among multiple columns of the macroblock, and to perform the first IDCT on pixel data of the selected columns; and
the second IDCT transform unit is configured to select, based on the scaling control signal, one column every X columns among multiple columns of a macroblock, which has been output from the orthogonal transform unit, and to perform the second IDCT only on orthogonally transformed pixel data subjected to the first IDCT of the selected columns, and outputs the transformed data.

6. The JPEG decoder according to claim 5, wherein the macroblock corresponds to an 8×8 macroblock, and the IDCT block, in ¼ scaling, comprises:
the first IDCT unit configured to perform the first IDCT only on pixel data of first and fifth columns among eight columns of the macroblock; and
the second IDCT unit configured to perform the second IDCT only on pixel data, which correspond to a first column first row, a first column fifth row, fifth column first row, and fifth column fifth row of the orthogonal-transformed macroblock, and to output the image file.

7. The JPEG decoder according to claim 5, wherein the macroblock corresponds to a macroblock of 8×8 pixels, and the IDCT block, in ½ scaling, comprises:
  the first IDCT unit configured to perform the first IDCT only on data of first, third, fifth, and seventh columns among eight columns of the macroblock; and
  the second IDCT unit configured to perform the second IDCT only on pixel data, which correspond to a first column first row, a first column third row, a first column fifth row, a first column seventh row, a third column first row, a third column third row, a third column fifth row, a third column seventh row, a fifth column first row, a fifth column third row, a fifth column fifth row, a fifth column seventh row, a seventh column first row, a seventh column third row, a seventh column fifth row, a seventh column seventh row of the orthogonal-transformed macroblock, and to output the image file.

8. The JPEG decoder according to claim 5, wherein the macroblock corresponds to a macroblock of 8×8 pixels, and the IDCT block, in ⅛ scaling, comprises:
  the first IDCT unit configured to perform the first IDCT only on pixel data of a first column among eight columns of the macroblock; and
  the second IDCT unit configured to perform the second IDCT on pixel data, which corresponds to a first column first row of the orthogonal-transformed macroblock, and to output the image file.

9. The JPEG decoder according to claim 2, wherein the image file, which has been scaled, is transmitted to a mobile LCD display so as to allow a preview of the image file in the mobile LCD display.

10. A scaling method of a JPEG decoder, wherein the JPEG decoder comprises a dequantization block and an integrated inverse discrete cosine transform (IDCT) block, wherein the IDCT block comprises a first IDCT unit, an orthogonal transform unit, and a second IDCT unit, the method comprising:
  (a) outputting encoded data as serial data through variable length decoding;
  (b) re-ordering the serial data in an 8×8 macroblock, which is a two-dimensional arrangement format;
  (c) dequantizing, by the dequantization block, at least a portion of pixel data of the 8×8 macroblock;
  (d) selecting, by the dequantization block and based on a scaling control signal, dequantized pixel data of the macroblock to output to the IDCT block;
  (e) outputting, by the dequantization block, the selected pixel data to the IDCT block;
  (f) selecting, by the first IDCT unit and based on the scaling control signal, pixel data output from the dequantization block to transform;
  (g) performing, by the first IDCT unit, a first IDCT on the selected pixel data output from the dequantization block comprising at least a first column and a second column which is selected from among eight columns such that no selected column is adjacent to another selected column;
  (h) performing, by the orthogonal transform unit, an orthogonal transform on the pixel data subjected to the first IDCT;
  (i) following step (h), selecting, by the second IDCT unit and based on the scaling control signal, at least a third column and a fourth column which is selected from among eight columns such that no selected column is adjacent to another selected column; and
  (j) performing, by the second IDCT unit, a second IDCT on only data within the selected columns that overlaps with data having been subjected to the first IDCT.

* * * * *